(12) United States Patent
Wu et al.

(10) Patent No.: US 8,465,616 B2
(45) Date of Patent: Jun. 18, 2013

(54) HOUSING AND METHOD FOR MAKING THE SAME

(75) Inventors: Kun-Tsan Wu, Taipei Hsien (TW); Li-Wen Tien, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 696 days.

(21) Appl. No.: 12/570,111

(22) Filed: Sep. 30, 2009

(65) Prior Publication Data

US 2011/0008582 A1   Jan. 13, 2011

(30) Foreign Application Priority Data

Jul. 10, 2009   (CN) .......................... 2009 1 0304240

(51) Int. Cl.
| | | |
|---|---|---|
| *B32B 37/00* | (2006.01) | |
| *B32B 37/02* | (2006.01) | |
| *B32B 37/12* | (2006.01) | |
| *B32B 37/14* | (2006.01) | |
| *B32B 38/00* | (2006.01) | |
| *B32B 38/04* | (2006.01) | |

(52) U.S. Cl.
USPC ........... 156/253; 156/250; 156/252; 156/256; 156/267

(58) Field of Classification Search
USPC .......................... 156/250, 252, 253, 256, 267
See application file for complete search history.

(56) References Cited

U.S. PATENT DOCUMENTS

| | | | |
|---|---|---|---|
| 5,403,424 A * | 4/1995 | Ehrat et al. .................... | 156/247 |
| 2003/0175488 A1* | 9/2003 | Asthana et al. ............... | 428/212 |
| 2009/0009941 A1* | 1/2009 | Hsu et al. ...................... | 361/681 |
| 2009/0040703 A1* | 2/2009 | Gotham et al. ............... | 361/681 |
| 2009/0080153 A1* | 3/2009 | Richardson et al. ..... | 361/679.56 |

* cited by examiner

*Primary Examiner* — Mark A Osele
*Assistant Examiner* — Christopher C Caillouet
(74) *Attorney, Agent, or Firm* — Altis Law Group, Inc.

(57) ABSTRACT

A method for making a housing comprising: providing a metal layer, a decorative layer, and an adhesive layer; attaching the adhesive layer to the decorative layer; attaching the adhesive layer to the metal layer to form a intermediate product; and punching the intermediate product by a stamping mold to form the housing. The application also discloses a housing used in a portable electronic device.

2 Claims, 2 Drawing Sheets

HOUSING AND METHOD FOR MAKING THE SAME

CROSS-REFERENCE TO RELATED APPLICATION

This application is related to co-pending U.S. patent application Ser. No. 12/570,094, entitled "HOUSING AND METHOD FOR MAKING THE SAME", by WU et al., which is the same assignee as the present application. The above-identified application is incorporated herein by reference.

BACKGROUND

1. Technical Field

The present disclosure relates to housings and methods for making the housings.

2. Description of Related Art

The housing for electronic devices can have a good tactility by forming a soft layer thereon. The soft layer is trimmed into a predetermined shape. The soft layer is attached to the housing by injection molding. However, the trimming process is costly and time consuming. Furthermore, the soft layer may subject to damage from the high temperatures of the injection molding.

Therefore, there is room for improvement within the art.

BRIEF DESCRIPTION OF THE DRAWINGS

Many aspects of a housing and method making the same can be better understood with reference to the following drawings. The components in the drawings are not necessarily to scale, the emphasis instead being placed upon clearly illustrating the principles of the present housing and method making the same. Moreover, in the drawings, like reference numerals designate corresponding parts throughout the several views.

DETAILED DESCRIPTION OF THE EMBODIMENTS

Figure 1:
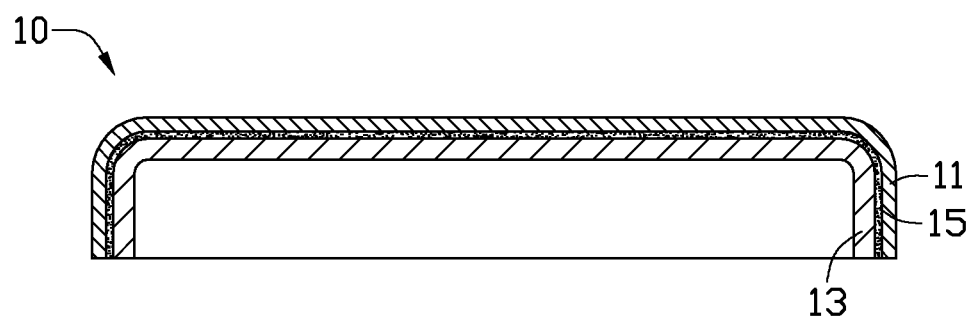
FIG. 1 is a cross-sectional view of a housing, according to an exemplary embodiment.

FIG. 1 shows a housing 10 used in a portable electronic device. The housing 10 includes a decorative layer 11, a metal layer 13, and an adhesive layer 15. The decorative layer 11 can be made of a soft material, such as leathers, fabrics, or plastic. The decorative layer 11 is adhered to the metal layer 13 by the adhesive layer 15. The adhesive layer 15 is located between the decorative layer 11 and the metal layer 13. The metal layer 13 and the decorative layer 11 are punched to form the housing 10.

Figure 2:
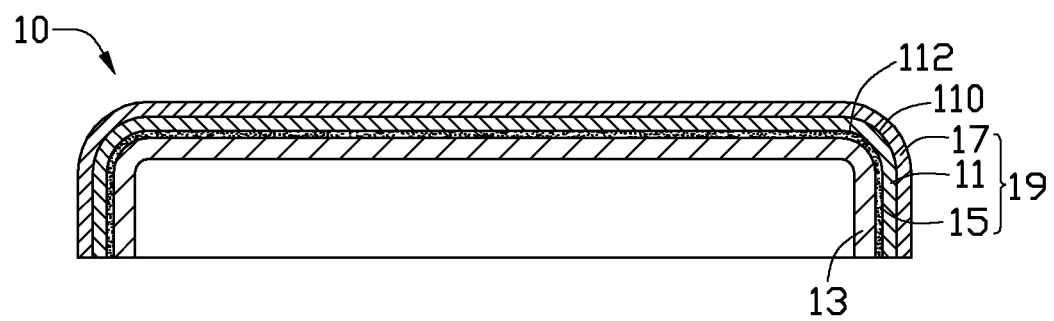
FIG. 2 is a cross-sectional view of the housing of FIG. 1 in manufacturing process.

Referring to FIG. 2, during making of the housing 10, the decorative layer 11, the metal layer 13, the adhesive layer 15, a protective layer 17, a pressing machine (not shown), a stamping mold (not shown), and a computer numerical control machine (CNC) (not shown) are provided. The decorative layer 11 includes a first surface 110 and a second surface 112 opposite to the first surface 110. The first surface 110 has a plurality of decorative patterns (not shown).

The protective layer 17 is attached to the first surface 110. The adhesive layer 15 has one side attached to the second surface 112 and another side attached to the metal layer 13, forming an intermediate product 19. The intermediate product 19 is received into the pressing machine and simultaneously heated. The adhesive layer 15 can be tightly adhered to the metal layer 13 by the impelling of the pressing machine. After the heating process, the intermediate product 19 is then placed into the stamping mold. The intermediate product 19 is punched to form the housing 10. After the punching process, superfluous edges may occur on the housing 10. The superfluous edges can be cut away by the computer numerical control machine. At last, the protective layer 17 is removed and the first surface 110 is washed.

It can be understood that the metal layer 13 can be made of stainless steel, magnesium aluminium alloy, aluminium, or aluminium alloy. The protective layer 17 can be made of polyethylene (PE) or polyethylene terephthalate (PET). The adhesive layer 15 may include a medium densitive mixture of polyethylene (60%), polyisobutene (25%), butyl rubber (10%), and microcrystal wax (5%).

It is to be understood that, the adhesive layer 15 can be previously formed on the metal layer 13. Then, the decorative layer 11 can be attached to the adhesive layer 15.

It is to be understood that the process of the intermediate product 19 pressed and heated by the pressing machine can be omitted.

It is to be understood that the protective layer 17 can be omitted. Accordingly, the process of washing the first surface 110 can be omitted.

It is to be further understood that the adhesive layer 15 can alternatively be one of a double-faced adhesive belt, ultraviolet rays (UV) gum, and cyanoacrylate adhesive, etc.

It is to be also understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for making a housing, comprising:
providing a metal layer, a decorative layer, and an adhesive layer, the adhesive layer including a medium densitive mixture of 60% polyethylene, 25% polyisobutene, 10% butyl rubber, and 5% microcrystal wax;
attaching a protective layer to a first side of the decorative layer;
attaching the adhesive layer to a second side of the decorative layer;
attaching the adhesive layer to the metal layer to form an intermediate product;
pressing and simultaneously heating the intermediate product;
punching the intermediate product using a stamping mold to form a predetermined shape with superfluous edges;
cutting the superfluous edges using a computer numerical control machine; and
removing the protective layer and washing the first side of the decorative layer to form the housing.

2. The method for making a housing as claimed in claim 1, wherein the decorative layer is made of leathers, fabrics, or plastic.

* * * * *